US011917425B2

(12) United States Patent
Kauffman et al.

(10) Patent No.: US 11,917,425 B2
(45) Date of Patent: Feb. 27, 2024

(54) VARIABLE BEAMWIDTH ANTENNA CONTROL FOR AERIAL VEHICLES

(71) Applicant: Honeywell International Inc., Charlotte, NC (US)

(72) Inventors: Donald C. Kauffman, Laurel, MD (US); Willard R. True, Kirkland, WA (US)

(73) Assignee: Honeywell International Inc., Charlotte, NC (US)

( * ) Notice: Subject to any disclaimer, the term of this patent is extended or adjusted under 35 U.S.C. 154(b) by 151 days.

(21) Appl. No.: 17/541,074

(22) Filed: Dec. 2, 2021

(65) Prior Publication Data

US 2023/0180021 A1 Jun. 8, 2023

(51) Int. Cl.
*H04W 16/28* (2009.01)
*H04B 7/185* (2006.01)

(52) U.S. Cl.
CPC ........ *H04W 16/28* (2013.01); *H04B 7/18508* (2013.01)

(58) Field of Classification Search
CPC ... H04W 16/28; H04W 84/005; H04W 84/06; H04B 7/18508; H04B 7/18504; H04B 7/18506
See application file for complete search history.

(56) References Cited

U.S. PATENT DOCUMENTS

| | | | |
|---|---|---|---|
| 9,622,133 B1 * | 4/2017 | Guvenc | H04B 7/18504 |
| 9,972,916 B2 | 5/2018 | Yang et al. | |
| 10,181,893 B2 | 1/2019 | Jalali et al. | |
| 2004/0116111 A1 * | 6/2004 | Saunders | H04W 16/18 |
| | | | 455/67.11 |
| 2014/0125511 A1 * | 5/2014 | Longstaff | G01S 13/882 |
| | | | 342/33 |

(Continued)

FOREIGN PATENT DOCUMENTS

EP 3512116 B1 5/2020
IN 201841024074 3/2020

OTHER PUBLICATIONS

Bo, Pan, et al. "The Research of Hardware-In-The-Loop Simulation on the Double-module Altimeter of Unmanned Aerial Vehicle (UAV)." 2008 2nd International Symposium on Systems and Control in Aerospace and Astronautics. IEEE, 2008. (Year: 2008).*

(Continued)

*Primary Examiner* — Sharad Rampuria
(74) *Attorney, Agent, or Firm* — Fogg & Powers LLC

(57) ABSTRACT

In an embodiment, a system comprises height-measuring circuitry coupled to a vehicle, in which the height-measuring circuitry is configured to measure a height parameter of the vehicle. The system further comprises a radio transceiver coupled to a portion of the vehicle, in which the radio is configured to transmit a radio frequency (RF) signal. The system further comprises at least one processor configured to receive the height parameter from the height-measuring circuitry. The system further comprises at least one antenna coupled to the radio transceiver and coupled to the at least one processor. The at least one antenna is configured to output the RF signal at a beamwidth, and the at least one processor is operative to configure the at least one antenna to vary the beamwidth of the RF signal based on the height parameter.

20 Claims, 13 Drawing Sheets

(56) References Cited

U.S. PATENT DOCUMENTS

| | | |
|---|---|---|
| 2017/0033458 A1 | 2/2017 | Haziza |
| 2020/0056876 A1* | 2/2020 | Shah .................. G01B 7/30 |
| 2021/0048522 A1* | 2/2021 | Pos .................. G01S 13/882 |
| 2021/0235285 A1* | 7/2021 | Guerena ............ H04W 16/28 |

OTHER PUBLICATIONS

Sun, Shu, George R. MacCartney, and Theodore S. Rappaport. "A novel millimeter-wave channel simulator and applications for 5G wireless communications." 2017 IEEE international conference on communications (ICC). IEEE, 2017. (Year: 2017).*

Shi et al., "A Magnetoelectric Dipole Antenna With Beamwidth Reconfiguration", IEEE Antennas and Wireless Propagation Letters, Apr. 2019, pp. 621 through 625, vol. 18, No. 4, IEEE.

Stouffer et al. "Reliable, Secure, and Scalable Communications, Navigation, and Surveillance (CNS) Options for Urban Air Mobility (UAM)", Science Applications International Corporation, Contract No. GS00Q14OADU130, Aug. 12, 2020, pp. 1 through 225, NASA Glenn Research Center, SAIC.

Wikipedia, "Vehicle-to-everything", Apr. 30, 2021, pp. 1 through 9, https://en.wikipedia.org/wiki/Vehicle-to-everything.

\* cited by examiner

VARIABLE BEAMWIDTH ANTENNA CONTROL FOR AERIAL VEHICLES

BACKGROUND

Aerial vehicles, such as Unmanned Air Systems (UAS) and Urban Air Mobility (UAM) vehicles, utilize communication links that provide coverage up to several thousand feet. These vehicles typically have antennas mounted on the vehicle that radiate a radio frequency (RF) signal towards the terrain to communicate with one or more ground stations in a communications network. To increase the coverage zone for the vehicle, hemispherical antennas can be used so that the downward radiating signal can reach multiple ground stations.

Although a large coverage zone can be beneficial for some applications, it can also consume channels associated with the multiple ground stations in the coverage zone. Consequently, channels consumed by aerial vehicles become unusable for other terrestrial-based users. As a result, aerial vehicles can create unnecessary signal leakage if they maintain a large coverage zone that includes multiple ground stations with which the aerial vehicle does not intend to communicate.

Unnecessary signal leakage can adversely impact signal access and quality in the communications network. Additionally, excess signal coverage can increase costs associated with communicating over a cellular communications network.

SUMMARY

In one embodiment, a system is provided. The system comprises at least one height-measuring circuitry coupled to a vehicle. The at least one height-measuring circuitry is configured to measure a height parameter of the vehicle. The system further comprises a radio transceiver coupled to a portion of the vehicle. The radio transceiver is configured to transmit a radio frequency (RF) signal and to receive RF signals. The system further comprises at least one processor configured to receive the height parameter from the at least one height-measuring circuitry. The system further comprises at least one antenna comprising a plurality of antenna elements coupled to the radio transceiver and coupled to the at least one processor. The at least one antenna is configured to output the RF signal at a beamwidth. The at least one processor is operative to configure the at least one antenna to vary the beamwidth of the RF signal based on the height parameter.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
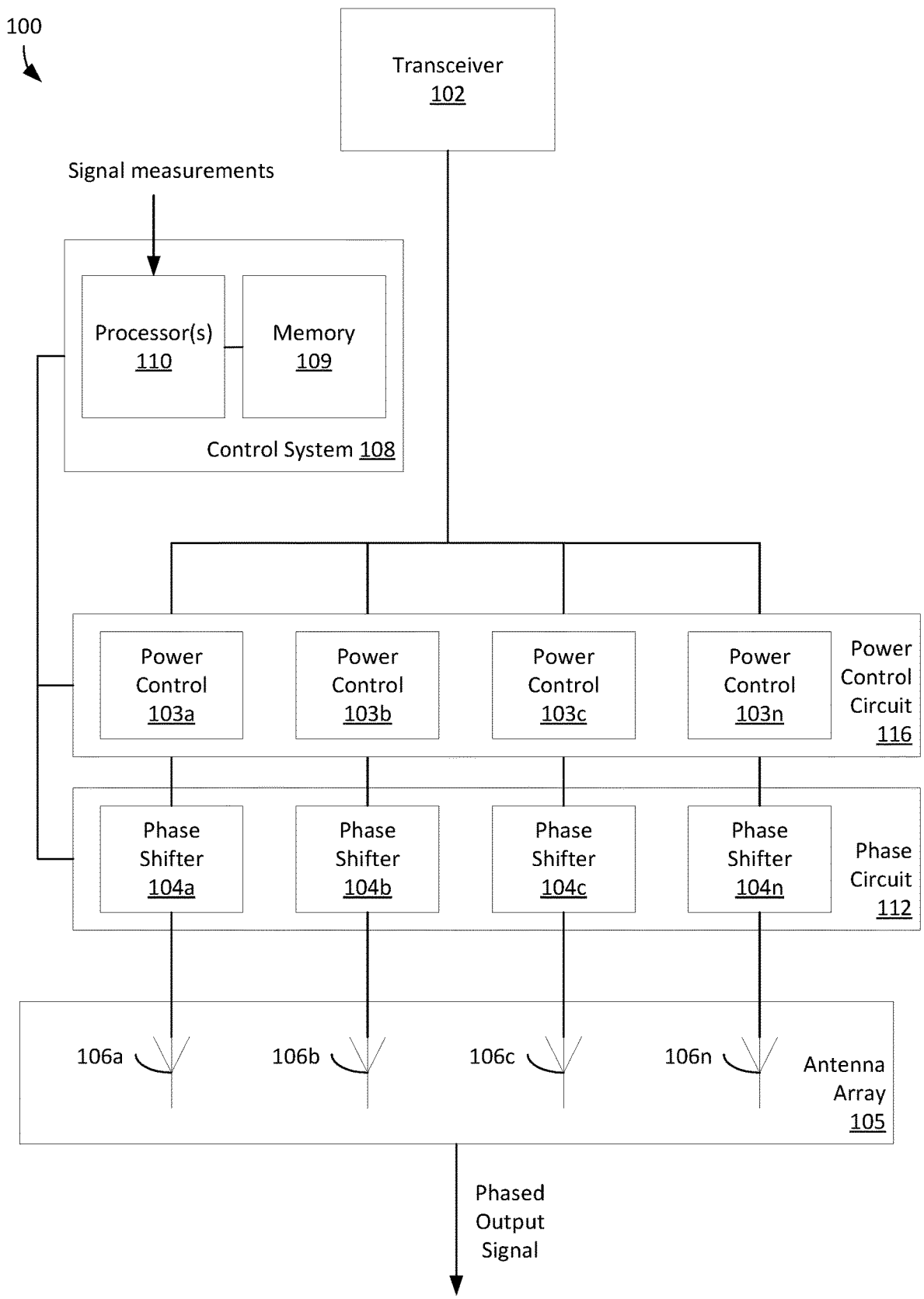
FIG. 1 depicts a block diagram of an exemplary phased antenna array configured to vary the beamwidth of an output signal based on the height of the phased antenna array, according to the teachings of the present disclosure.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In aerial-ground communications, aerial vehicles must establish a communication link with one or more intended recipients on the ground before communications can be established. This can be achieved by communicating RF signals from an antenna on the vehicle towards the intended ground recipients. The area formed by the projection of communication signals from the aerial vehicle on the ground defines the coverage zone, which can include multiple ground recipients that receive RF signals. Most advances in aerial-ground communications have focused on acquiring an intended ground recipient from the aerial vehicle, and increasing the size of the coverage zone can aid in this endeavor.

A more nuanced problem in aerial-ground communications concerns the impact to users in a communications network resulting from excessive signal coverage when communicating to ground recipients. This problem has not been extensively addressed in contemporary ground-based communication techniques despite the impact it has to signal quality in shared communication networks. Excess coverage from aerial vehicles can limit spectrum access in the shared communication network for other spectrum users, particularly terrestrial-based users.

This disclosure describes techniques to actively monitor the coverage zone for ground-based communication for aerial vehicles so that the resultant coverage zone both enables communication with the vehicle and its intended recipient while also reducing excess interference on other entities with which the vehicle does not intend to communicate. This effect can be achieved by adjusting a beamwidth of an antenna mounted on the vehicle based on the height of the antenna above the terrain. As the height of the antenna increases, its beamwidth is reduced, thus enabling for a more focused coverage zone and enhanced reliability in communicating with intended recipients.

These techniques can also improve signal communication from the perspective of the aerial vehicle. By controlling the beamwidth as a function of the height above terrain, signals transmitted by the aerial vehicle can be more focused, resulting in increased gain in the desired coverage zone, as well as improved signal transmission range as the aerial vehicle elevates above the terrain.

Referring to the accompanying drawings, FIG. 1 depicts a block diagram of an exemplary phased antenna array 100 configured to vary the beamwidth of an output signal based on the height of the phased antenna array. Phased antenna array 100 can be mounted on an aerial vehicle, for example an unmanned air systems (UAS), urban air mobility (UAM) vehicle, or advanced air mobility (AAM) vehicle, but can also be mounted on any other type of aerial vehicle. In some embodiments, phased antenna array 100 is mounted at the bottom side of the aerial vehicle. Phased antenna array 100 can be coupled to other communicative systems on a vehicle, such as a communications management system or communications management function of the vehicle computer.

Phased antenna array 100 includes a transceiver 102 configured to generate radio frequency (RF) signals and output the RF signals to other components electrically coupled downstream of transceiver 102. Transceiver 102 can be, for example, a radio transceiver comprising circuitry that receives electric signals from a power source (not pictured in FIG. 1) and convert the electric signals into RF signals for use in RF communication from phased antenna array 100. Transceiver 102 can include any number of analog and/or digital circuitry including but not limited to: power supply circuitry, oscillatory circuitry (to generate wave signals), and modulation circuitry (to incorporate transmitted information in the outputted signals), in addition to amplifying circuitry and impedance-matching circuitry.

RF signals are transmitted to a power control circuit 116 that includes an N amount of power controls 103$a$-$n$. Each power control 103$a$-$n$ is electrically coupled in parallel and configured to receive a portion of the RF signal from transceiver 102. Power control circuit 116 through the individual power controls 103$a$-$n$ is configured to adjust the power of each respective RF signal portion, which can differ in power between different power controls in power control circuit 116.

The power-adjusted RF signals are received at a phase circuit 112, which includes an N amount of phase shifters 104 electrically coupled to the output of power circuit 116. Each phase shifter 104 is electrically connected in parallel with each other and configured to adjust a phase of the output RF signal from transceiver 102. While FIG. 1 illustrates four phase shifters (phase shifter 104$a$, phase shifter 104$b$, phase shifter 104$c$, phase shifter 104$n$), phase circuit 112 can include any number of phase shifters. Each phase shifter 104 receives a portion of the power-adjusted RF signal and includes analog and/or digital circuitry configured to adjust a phase of the respective RF signal portion based on control signals from a control system 108, as described further below. The phase-adjusted output signals from each phase shifter 104 may have a distinct phase component. For example, the phase-adjusted output signal from phase shifter 104$a$ can have a different phase than the phase-adjusted output signal of phase shifter 104$b$, and so on for each phase shifter in phase circuit 112.

An antenna array 105 receives each phase-adjusted output signal from each phase shifter 104 in phase circuit 112. Antenna array 105 includes any number N of antenna elements 106 configured to transmit a phase-adjusted output signal from phase circuit 112. As shown in FIG. 1, the output of each phase shifter 104 is respectively coupled to an antenna element 106 in antenna array 105. For example, phase shifter 104$a$ is coupled to antenna element 106$a$, phase shifter 104$b$ is coupled to antenna element 106$b$, and so on for each phase shifter. Therefore, in some embodiments, the number of antenna elements 106 matches the number of phase shifters 104. Each antenna element 106 can be an omnidirectional antenna, one wavelength dipole, half wavelength dipole, one-quarter wavelength dipole, or any other antenna configuration.

Each antenna element 106 is configured to transmit an RF signal based on the respective phase-adjusted and power-adjusted output signal received from the respective phase shifter 104. The output signals from each of the antenna elements 106 constructively interfere to create a superimposed, coherent, phased output signal (e.g., a plane wave) that is transmitted from antenna array 105 and which can be oriented towards one or more intended recipients in a coverage zone to enable RF communications between the operator of the phased antenna array 100 and the intended recipients. The intended recipients can include one or more ground stations or cellular base stations. The phased output signal from antenna array 105 composed of the individual signals output from each antenna element 106 has a beamwidth that determines the signal coverage of the phased output signal.

The direction of the phased output signal can be controlled through control system 108 that includes one or more processors 110 coupled to at least one memory 109. Control system 108 is coupled to power control circuit 116 and configured to direct each power control 103$a$-$n$ of power control circuit 116 to output a power-controlled signal to each phase shifter 104 of phase circuit 112. Control system 108 is also coupled to phase circuit 112 and configured to direct each phase shifter 104 of phase circuit 112 to output a phase-adjusted signal so that the output signal from antenna array 105 transmits a coherent output signal. Control system 108 (including processor 110) may include any one or combination of processors, microprocessors, digital signal processors, application specific integrated circuits, field programmable gate arrays, and/or other similar variants thereof. Control system 108 (including processor 110) may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Memory 109 can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. Memory 109 may also include one or more databases to store acquired data.

To provide beam steering functionality, control system 108 sends control signals to phase circuit 112 that delay the transmittance of the output signal of each phase shifter 104 for a designated time period. For example, control system 108 (through processor 110) can configure phase circuit 112 so that phase shifter 104a outputs a signal at a first time period, followed by phase shifter 104b outputting a signal at a second period later than the first time period, and so on. This technique enables processor 110 to control the outward direction of the phased output signal, as the cascaded time delay corresponding to each respective phase shifter 104 enables each respectively coupled antenna element 106 to sequentially output a signal based on the time delay relative to a neighboring antenna. The resulting phased output wave then propagates in a direction based on the time delay. To direct the phased output signal to the left of the vertical axis in FIG. 1, for instance, antenna element 106n would output a signal, followed by antenna element 106c, then antenna element 106b, and lastly antenna element 106a.

The output signal will radiate at a beamwidth that can be determined based on the power of the signals radiated by antenna elements 106a-n, the phase of each signal, the spacing between antenna elements 106a-n in antenna array 105, and the properties of the antenna. The beamwidth of the phased output signal is a measure of the solid angle at which the phased output signal is radiated outward at an arbitrary intensity along the path of the phased output signal. For example, the arbitrary intensity can be determined as 3 dB lower on both sides of the main beam.

In addition to determining the direction of the phased output signal, processor 110 can further control the beamwidth of the phased output signal. For example, processor 110 can receive one or more height measurements from height-measuring circuitry (see FIG. 3) that quantify the height above terrain or other height parameter of the phased antenna array 100 on the vehicle. In some embodiments, the height measurements include measuring a height above terrain ("HAT"), but height information such as the height above terrain can also be accessed from other sources in the communications network utilized by the vehicle in communicating with intended recipients. As used herein, "height above terrain" means the vertical distance from the point of measurement to the terrain. However, other height parameters can be measured, such as the altitude. Control system 108 can also include height-measuring circuitry configured to measure the height of the phased antenna array 100.

Processor 110 uses the height measurements to adjust the beamwidth of the phased output signal from phased antenna array 100. As phased antenna array 100 increases in vertical distance from the terrain (determined by the increased height above terrain measurements), control system 108 controls phase circuit 112 to output phase-adjusted signals so that the combined phased output signal radiating from antenna array 105 has a smaller beamwidth. In some embodiments, control system 108 narrows the beamwidth of the phased output signal by reducing the solid angle of radiation from antenna array 105, which in turn reduces the spread of the radiating phased output signal. Additionally, processor 110 can access a look-up table stored in memory 109 that includes beamwidth values that correspond to a given height above terrain measurement, which enables control system 108 to determine the appropriate beamwidth.

However, the beamwidth of the phased output signal can be adjusted with other techniques as well. Another example (which can be combined with the techniques described above) utilizes the parameters of a desired coverage zone to vary the beamwidth of phased antenna array 100 as a function of the desired coverage zone. Control system 108 can be configured to determine a desired coverage zone to communicate, or the coverage zone information can be provided by control system 108 from other systems. For example, the area of the coverage zone can be selected based on the locations of the intended recipient(s) in a geographical area that phased antenna array 100 desires to establish communications with. Once the coverage zone is determined, control system 108 controls phase circuit 112 so that the phased output signal radiates only in the desired coverage zone and does not expand outside of the coverage zone. If phased antenna array 100 increases in height as evidenced by increasing height above terrain measurements, control system 108 can reduce the beamwidth of the phased output signal accordingly to maintain the desired coverage zone and hence avoid excess signal leakage outside the coverage zone if the beamwidth were not adjusted as the height increases. FIGS. 5-11 illustrate various methods in which the beamwidth of the phased output signal can be adjusted.

Figure 2A:
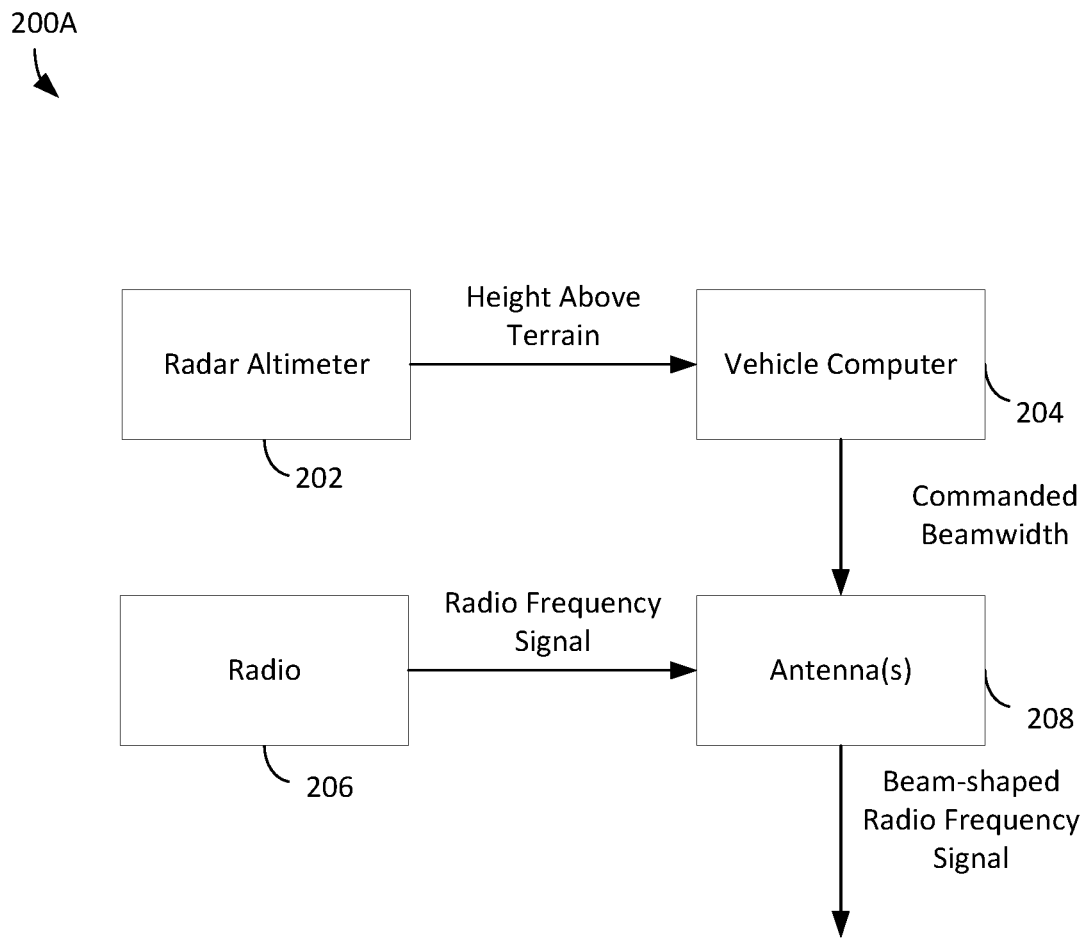
FIGS. 2A-2C depict block diagrams of exemplary systems configured to vary a beamwidth transmitted by at least one antenna, according to the teachings of the present disclosure.
Figure 2B:
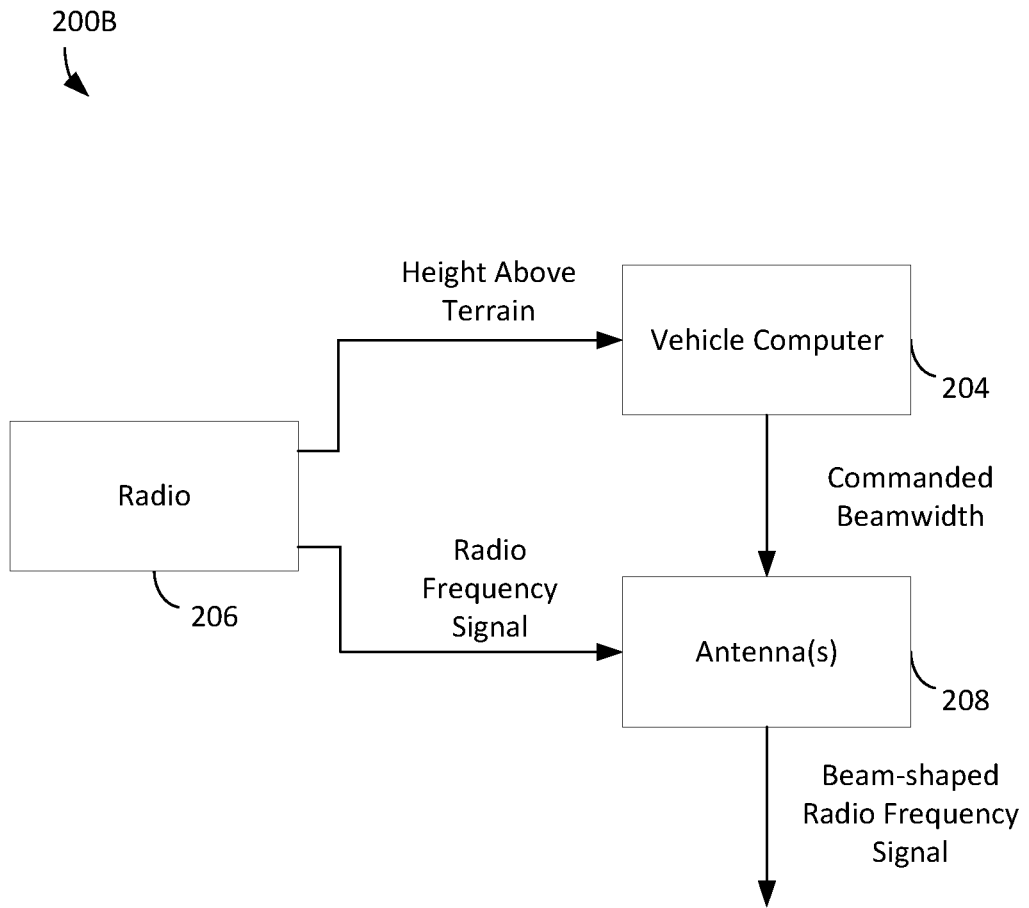
Figure 2C:
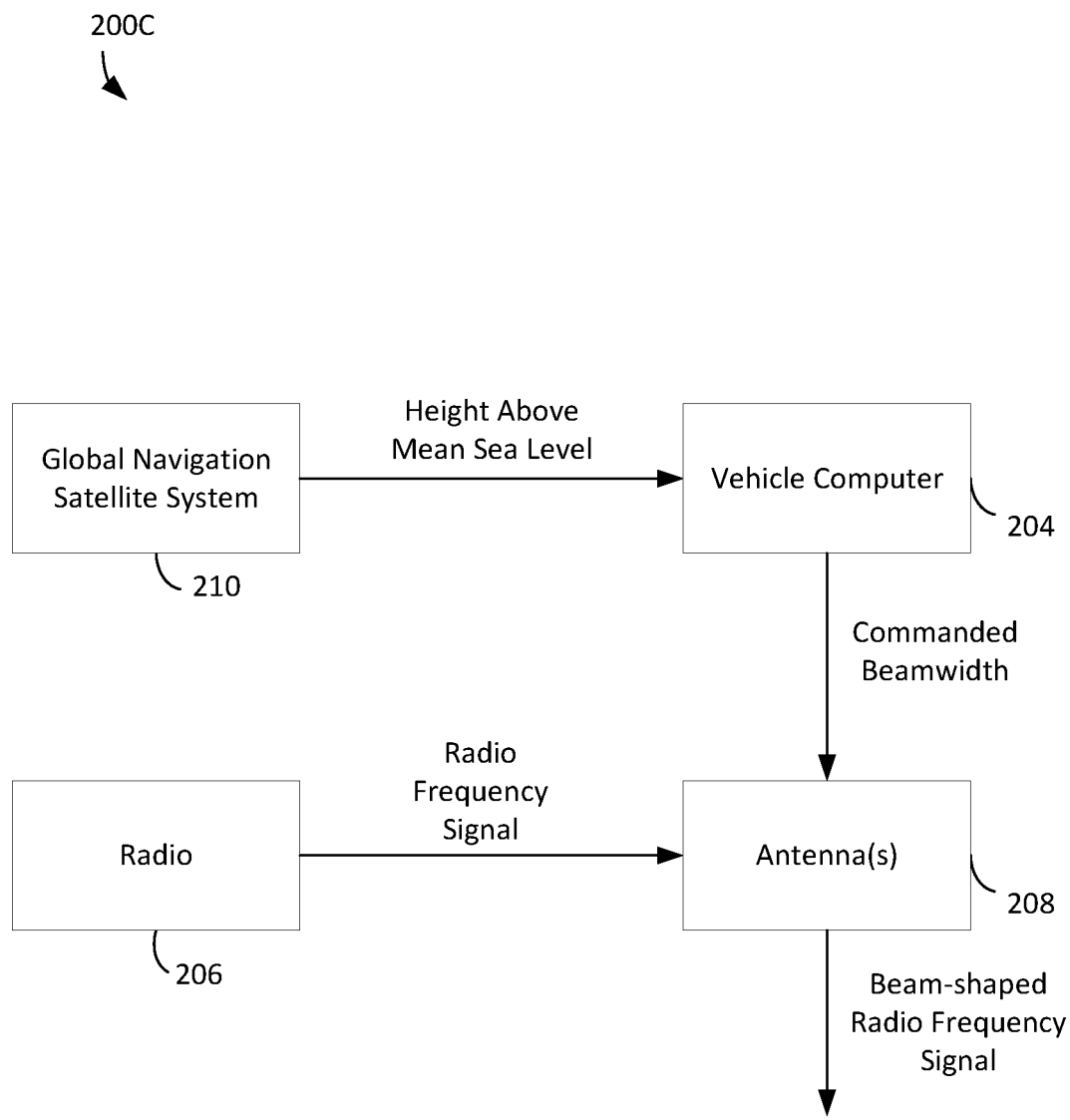

While FIG. 1 illustrates structures for controlling a beamwidth of an output RF signal in the context of a phased antenna array, other antenna structures may be used to communicate RF signals to ground stations. For example, FIGS. 2A-2C depict embodiments in which the beamwidth of an output RF signal is varied from an antenna comprising a plurality of antenna elements communicatively coupled to a radio. Alternatively to the phased array antenna described in FIG. 1, the antenna can comprise horn antennas, patch antennas, or a Yagi-Uda antenna as examples. Other antennas may be used to communicate RF signals to ground stations. The various embodiments between FIGS. 2A-2C are briefly described as follows. FIGS. 2A-2B depict adjusting the beamwidth of an output RF signal based on height above terrain measurements. FIG. 2C depicts adjusting the beamwidth of an output RF signal based on height above mean sea level measurements.

Referring to FIG. 2A, a system 200A includes a radar altimeter 202 configured to measure the height above terrain and provides the height above terrain measurements to a vehicle computer 204. Vehicle computer 204 includes one or more processors configured to receive the height above terrain measurements and to calculate an updated beamwidth for an output RF signal based on the height above terrain measurements. For example, if the height above terrain increases, vehicle computer 204 calculates a reduced beamwidth and provides the updated beamwidth to a antenna 208. Additionally, antenna 208 also receives an RF signal from a radio 206. Antenna 208 then radiates an output RF signal with the beamwidth specified by vehicle computer 204 towards one or more intended recipients.

Referring to FIG. 2B, a system 200B operates similarly to system 200A described above. In this embodiment, however, radio 206 includes height-measuring circuitry configured to measure the height above terrain, thereby enabling radio 206 to provide both the height above terrain measurements to vehicle computer 204, and an RF signal to antenna 208 communicatively coupled to radio 206. Vehicle computer 204 receives the height above terrain measurements from radio 206 and calculates an updated beamwidth based on the height above terrain. Antenna 208 then radiates an output RF signal with the beamwidth specified by vehicle computer 204 towards one or more intended recipients.

Referring to FIG. 2C, instead of a radar altimeter as shown in system 200A, a system 200C includes a global navigation satellite system (GNSS) receiver 210, which is configured to receive signals that correspond to the position of the GNSS receiver 210 in a GNSS satellite constellation. The global navigation satellite system can be a global positioning system (GPS), but can also be any other type of GNSS system (Galileo, Beidou, or GLONASS, for example). As part of the navigation solution process, GNSS receiver 210 receives measurements that correspond to a height above mean sea level and provides the measurements to vehicle computer 204. In some embodiments, GNSS receiver 210 provides a height above reference ellipsoid model designed to approximate the average sea level; the height above mean sea level can then be derived from the GNSS ellipsoid model. Vehicle computer 204 calculates an updated beamwidth based on the height above mean sea level measurements. Antenna 208 receives an RF signal from radio 206 and the updated beamwidth and radiates an output RF signal with the beamwidth specified by vehicle computer 204 towards one or more intended recipients.

Figure 3:
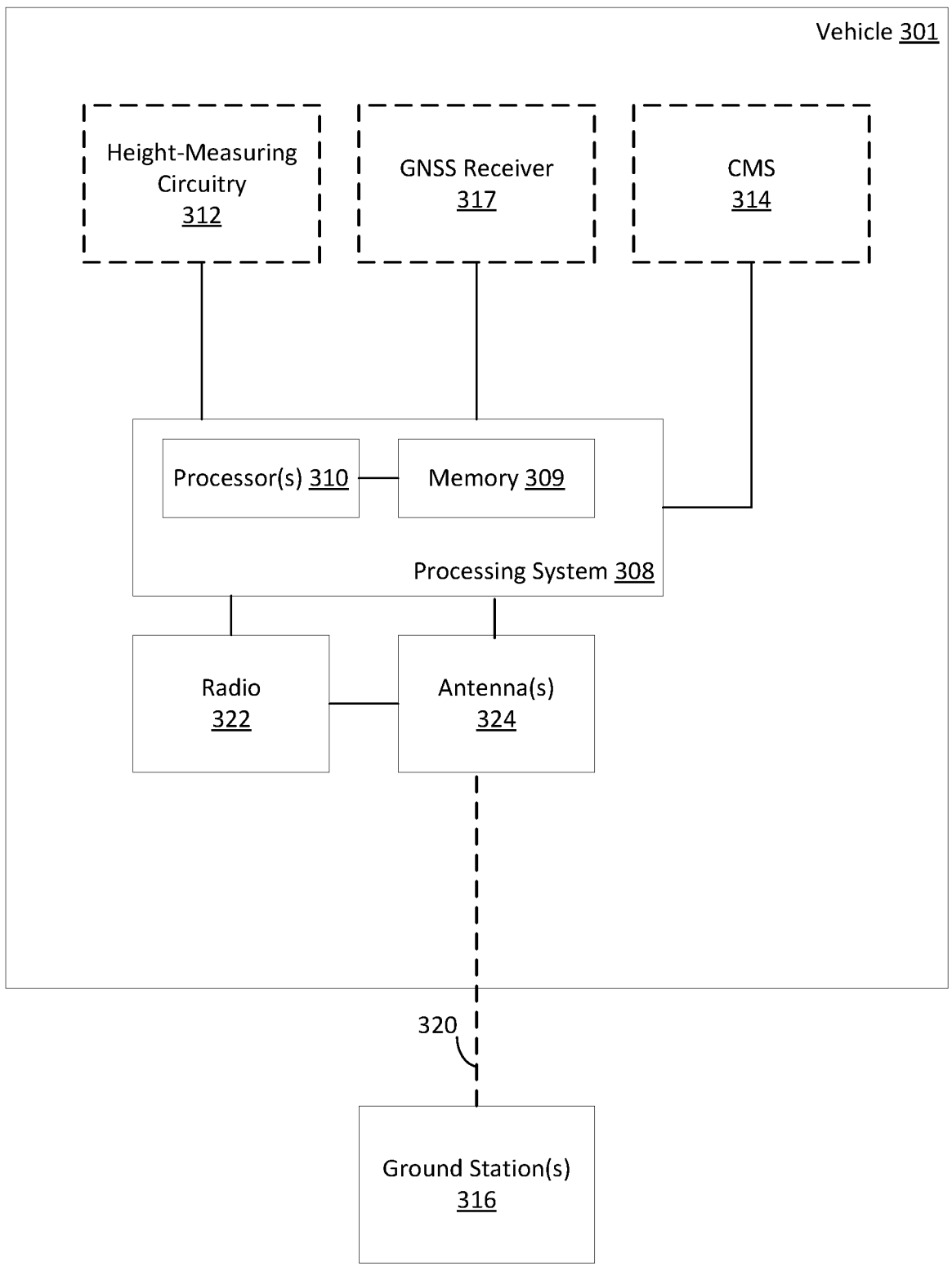
FIG. 3 depicts a block diagram of an exemplary system on a vehicle configured to adjust the beamwidth of an output signal of at least one antenna, according to the teachings of the present disclosure.

FIG. 3 depicts a block diagram illustrating an exemplary embodiment of a system configured to control the beamwidth of an output signal using the techniques described above with respect to FIGS. 1-2. Some components of the system are not shown for simplicity and clarity in the illustration.

As shown in FIG. 3, a radio 322 and antenna 324 is coupled to a vehicle 301, which can be any type of aerial vehicle. In some embodiments, radio 322 is mounted externally, internally, or a combination thereof on a portion of vehicle 301. Antenna 324 includes a plurality of antenna elements coupled at one or more locations of vehicle 301. The antenna elements can form part of an antenna array such as the phased antenna array of FIG. 1, a magnetoelectric dipole antenna array, or other array configurations. Both radio 322 and antenna 324 are coupled to processing system 308, which includes one or more processors 310 coupled to a memory 309. Each component in processing system 308 functions similarly to control system 108, processor 110, and memory 109 described above. However, although processing system 308 is shown independent of radio 322, processing system 308 can be integrated with radio 322 and/or antenna 324 into a single unit or module, and can be coupled to radio 322 and antenna 324 from another part of vehicle 301. In some embodiments, antenna 324 can be separated from or integrated with radio 322 and can be communicatively coupled to radio 322 on another part of vehicle 301.

Vehicle 301 can establish a communication link with one or more ground stations 316. A single ground station 316 is depicted in FIG. 3 and described pedagogically below, understanding that the same principles can apply to multiple ground stations or other ground-based recipients. One such communication link 320 can be made between antenna 324 and ground station 316 as a result of the output RF signal from antenna 324 which radiates towards an RF receiver coupled to ground station 316. Vehicle 301 can communicate with ground station 316 as part of a communications network, such as a 5G (fifth generation) communications network or other cellular communications networks.

Additionally, vehicle 301 optionally includes height-measuring circuitry 312 coupled to processing system 308 in the example shown in FIG. 3. Height-measuring circuitry 312 includes any type of circuitry or sensor(s) configured to measure the height of vehicle 301. For example, height-measuring circuitry 312 can include a radar altimeter (or altimeter circuitry). The height measurements are provided to processing system 308 for use in adjusting the beamwidth of the phased and power-adjusted output signal transmitted from antenna 324. In some embodiments, height-measuring circuitry 312 is configured to measure a height above terrain. However, height-measuring circuitry 312 is optional because in some embodiments processing system 308 includes height-measuring circuitry, or height-measuring information can be acquired from the communications network utilized by vehicle 301. Height-measuring circuitry 312 is also optional because in some embodiments, processing system 308 controls the beamwidth based on height above mean sea level measurements provided by an optional GNSS receiver 317. However, vehicle 301 can include both height-measuring circuitry 312 and GNSS receiver 317 and can adjust the beamwidth of output signals based on information provided by both height-measuring circuitry 312 in conjunction with GNSS receiver 317.

Processing system 308 is optionally coupled to a communications management system (CMS) 314 onboard vehicle 301. CMS 314 is configured to monitor communications between vehicle 301 and external entities from the vehicle, for example, ground station 316, other vehicles, and equipment onboard vehicle 301. CMS 314 can include a communications management unit (CMU) or can implement a communications management function (CMF). In some embodiments the communication management function may reside in the vehicle computer 204. Personnel operating vehicle 301 (e.g., a pilot in the case of sufficiently large vehicles or a remote operator/technician for smaller vehicles) can interface with CMS 314 to set parameters used to control the beamwidth. For example, an operator can input a desired coverage zone area so that the antenna 324 outputs a signal that orients towards the desired coverage zone, and maintains the parameters of the desired coverage zone even as vehicle 301 changes height (by narrowing the beamwidth of the output signal as vehicle 301 elevates, for instance). Processing system 308 can also send data to CMS 314.

Although not depicted in FIG. 3, processing system 308 can also be coupled to other systems onboard vehicle 301, such as flight management or flight control systems, pilot interface devices, portable passenger electronics, command and control avionics, mission computers, or other sensors and devices.

Figure 4:
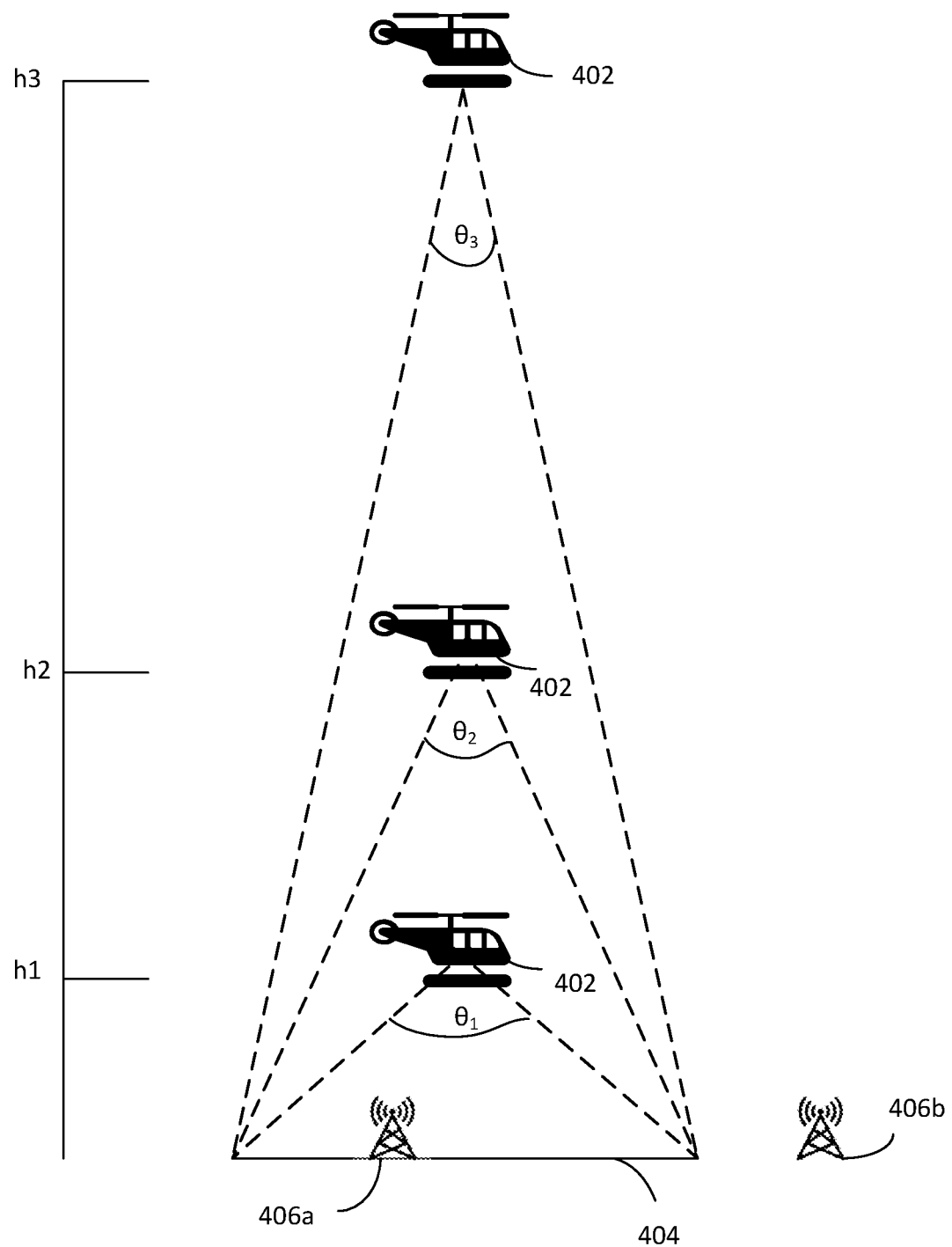
FIG. 4 depicts a diagram of varying a beamwidth of at least one antenna mounted on a vehicle based on the height of the at least one antenna on the vehicle, according to the teachings of the present disclosure.

FIG. 4 depicts the operation of varying a beamwidth of at least one antenna comprising a plurality of antenna elements mounted on a vehicle 402 based on the height over a coverage zone 404. For simplicity, the terrain in coverage zone 404 is flat, understanding that oftentimes this is not the case—the terrain may include many kinds of aberrations such as hills and slopes, natural formations (mountains, rivers and lakes), and artificial edifices (buildings, roads, towers) present in coverage zone 404. As referenced above, vehicle 402 may be any type of aerial vehicle.

As shown in FIG. 4, vehicle 402 can be situated above coverage zone 404 at various different heights. As vehicle 402 begins flight and elevates to a height h1 above coverage zone 404, a radio on vehicle 402 outputs an RF signal having a beamwidth $\theta_1$. In one embodiment, the beamwidth is calculated based on the following equation:

$$\theta = 2\tan^{-1}\frac{d}{h}$$

where d is the diameter of the coverage zone 404 and h is the height of the vehicle, which can be a height above terrain, altitude, or height above mean sea level depending on the embodiment. Other equations can be used as well. The projection of the RF signal radiating towards coverage zone 404 enables vehicle 402 to communicate via one or more ground stations within the coverage zone that receive a portion of the RF signal. For example, the beamwidth at height h1 can have a value of 127 degrees when h1 is a value of approximately 1,000 feet for a 2,000-foot coverage zone diameter.

As vehicle 402 elevates above coverage zone 404, the beamwidth subsequently reduces as the vehicle receives increasing height above terrain measurements. When vehicle 402 elevates to a height h2 above coverage zone 404, the at least one antenna then outputs an RF signal having a beamwidth $\theta_2$, which as a numerical example, can have a value of approximately 43 degrees at a height of 5,000 feet for a 2,000-foot coverage zone diameter. As illustrated in FIG. 4, the beamwidth at h1 is greater than the beamwidth at h2, which is further shown quantitatively given that an angle of 127 degrees is greater than an angle of 43 degrees.

Likewise, when vehicle 402 elevates to a height h3, the beamwidth of the RF output by the at least one antenna reduces even further to $\theta_3$, which is less than both beamwidths $\theta_2$ and $\theta_1$. As an example, the beamwidth $\theta_3$ can have a value of approximately 22 degrees at a height of 10,000 feet for a 2,000-foot coverage zone diameter. As shown in FIG. 4, the antenna array can maintain the same coverage zone 404 as the height of vehicle 402 changes. If the vehicle were not able to narrow the beamwidth as a function of the height, the coverage zone 404 would expand to cover a larger geographical area as the increased height enables the RF signal to radially propagate over a larger distance to the ground. By adjusting the beamwidth of the RF signal as a function of height, the vehicle can reduce excess signal leakage by maintaining the desired coverage zone 404 without introducing additional interference from other recipients outside of coverage zone 404.

Also shown in FIG. 4 are two ground stations 406a, 406b that are configured to receive the output RF signal radiating from vehicle 402. Either one or both of ground stations 406a, 406b may be intended recipients that vehicle 402 wishes to communicate with, and vehicle 402 may adjust the beamwidth of the output RF signal accordingly so that the coverage zone of the radiated signal includes the intended ground station(s). For example, if vehicle 402 intends to communicate with ground station 406a and not ground station 406b, the beamwidth of the output signal as currently illustrated in FIG. 4 is more than sufficient to establish communications with ground station 406a. However, to avoid adverse effects to other ground stations utilizing the communications network, such as ground station 406b, vehicle 402 is configured to narrow the beamwidth (and thereby reduce the area of coverage zone 404) while still maintaining communication with ground station 406a. Similarly, if vehicle 402 intends to communicate with ground station 406b, vehicle 402 is configured to broaden the beamwidth (and thereby increase the area of coverage zone 404) to establish communications with ground station 406a. Exemplary techniques for adjusting the beamwidth are described further with respect to FIGS. 5-11.

Although the beamwidth is illustrated as projected directly downward onto coverage zone 404, in some embodiments, the beamwidth can be oriented at different angles from the vertical to direct the output RF signal to a particular part of the terrain. Simply put, the selected coverage zone 404 need not be directly below vehicle 402 as shown in FIG. 4.

Figure 5:
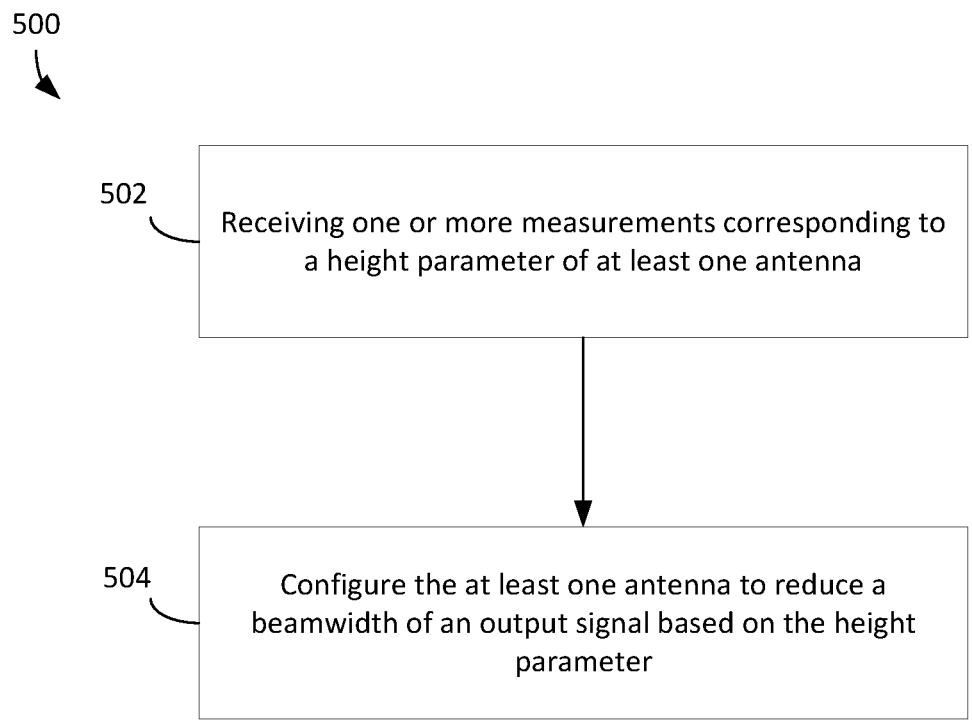
FIG. 5 depicts a flow diagram of an exemplary method for processing received height measurements to vary a beamwidth of at least one antenna, according to the teachings of the present disclosure.

FIG. 5 depicts a flow diagram of an exemplary method 500 for processing received height measurements to adjust a beamwidth of at least one antenna. Method 500 may be implemented via the techniques described with respect to FIGS. 1-4, but may be implemented via other techniques as well. For example, method 500 can be implemented using the processing described with control system 108, processing system 308, or the processing performed by vehicle computer 204. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Beginning at block 502, method 500 comprises receiving one or more measurements corresponding to a height parameter, such as from height above terrain circuitry. The height parameter can include an altitude, a height above terrain, and/or a height above mean sea level. A radar altimeter, GNSS receiver, or other circuitry can be used to determine the height, or such information can be acquired from the communications network.

Method 500 proceeds to block 504 by configuring at least one antenna to adjust a beamwidth of an output signal based on the height parameter. In some embodiments, the at least one antenna includes a plurality of antenna elements, which can be in the form of a phased antenna array or a dipole antenna array. In some embodiments, beamwidth values corresponding to a given height above terrain measurement are stored in a look-up table in memory accessible by a processor. In some embodiments, the beamwidth of the output signal is adjusted based on the desired coverage area. In some embodiments, the beamwidth is narrowed when the vehicle ascends, and is widened when the vehicle descends. The beamwidth can also be adjusted based on the techniques described in FIGS. 6-11 below.

Figure 6:
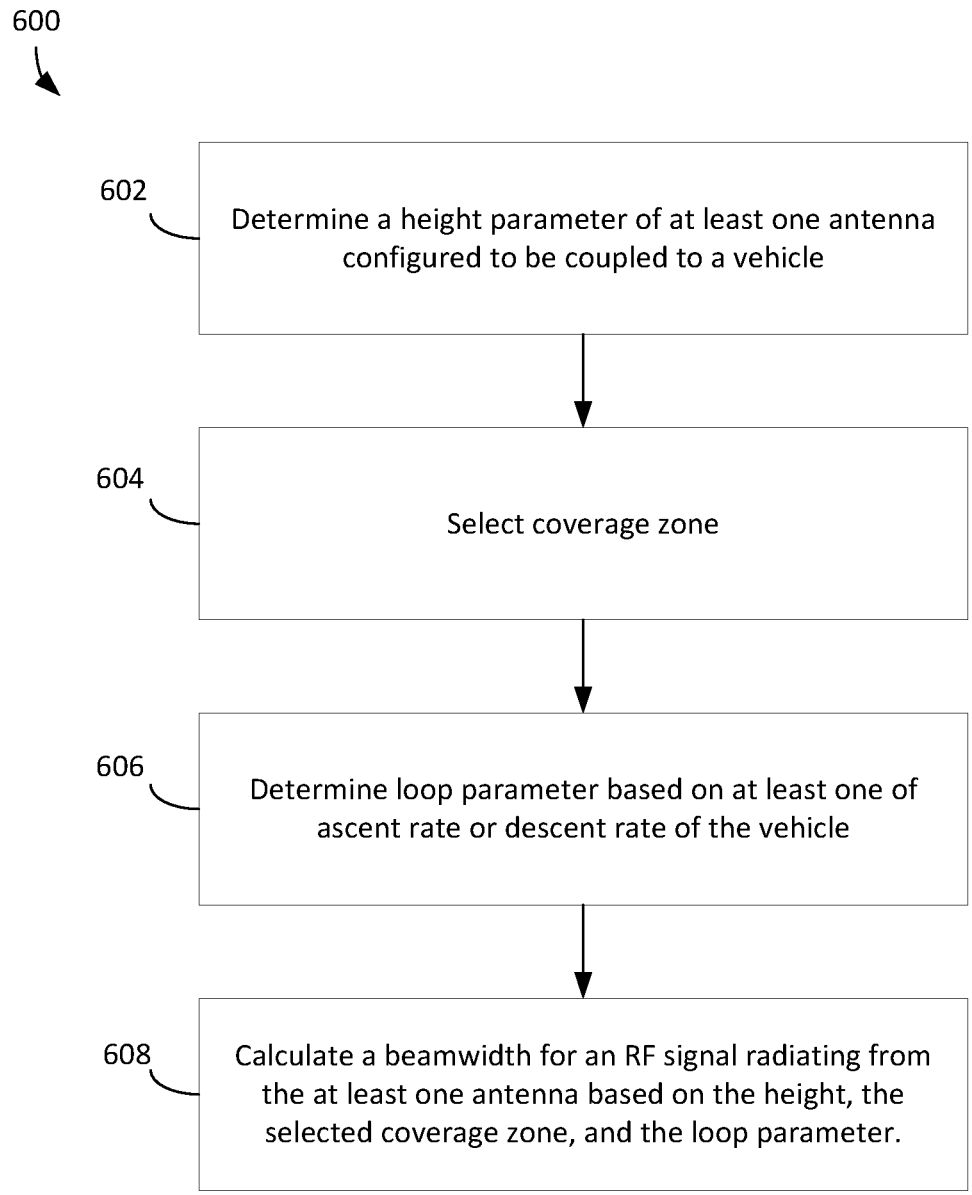
FIG. 6 depicts a flow diagram of an exemplary method for adjusting a beamwidth of at least one antenna to maintain a selected coverage zone, according to the teachings of the present disclosure.

FIG. 6 depicts a flow diagram of an exemplary method 600 for adjusting a beamwidth of at least one antenna to maintain a selected coverage zone. Method 600 may be implemented via the techniques described in FIGS. 1-5 above, but may be implemented via other techniques as well.

In block 602, method 600 determines a height parameter corresponding to at an antenna configured to be coupled to a vehicle. In embodiments where the height is determined from height above mean sea level measurements received by a GNSS receiver, method 600 determines the height above terrain by subtracting the height above mean sea level of the terrain from the height above mean sea level of the vehicle.

Method 600 proceeds to block 604 by selecting a coverage zone. Method 600 selects the coverage zone so that the intended recipient(s) lie inside of the beamwidth of the output RF signal. In some embodiments, the coverage zone is selected based on the locations of the intended recipients, such as the spacing between cellular network ground stations.

Method 600 proceeds to block 606 by determining a loop parameter based on at least one of an ascent rate or descent rate of the vehicle. The loop parameter determines the frequency at which the beamwidth of the output RF signal is updated based on the changing height of the radio. In some embodiments, the loop parameter is a constant. The constant can represent, in one example, the maximum vertical rate of ascent or the maximum vertical rate of descent of the vehicle, whichever is faster. Alternatively, there can be a loop constant that is used during ascent and a different loop constant that is used during descent.

At block 608, method 600 calculates a beamwidth for an RF signal radiating from the antenna array based on the height, the selected coverage zone, and the loop parameter. This enables the beamwidth to maintain communication with the intended recipient(s) in the coverage zone while also updating the beamwidth at a rate so that the output RF signal is not within sensitivity of one or more unintended recipients (unintended ground stations) as the vehicle ascends or descends in height. In some embodiments, updating the beamwidth can take into account input from cellular service providers that enable communications over the cellular communications network to limit the amount of unintended ground stations within the beamwidth range of the output RF signal. For example, the cellular service provider can specify a maximum amount of impacted ground stations, and method 600 can adjust the beamwidth so that the output RF signal does not reach more than the specified number of impacted ground stations.

Figure 7:
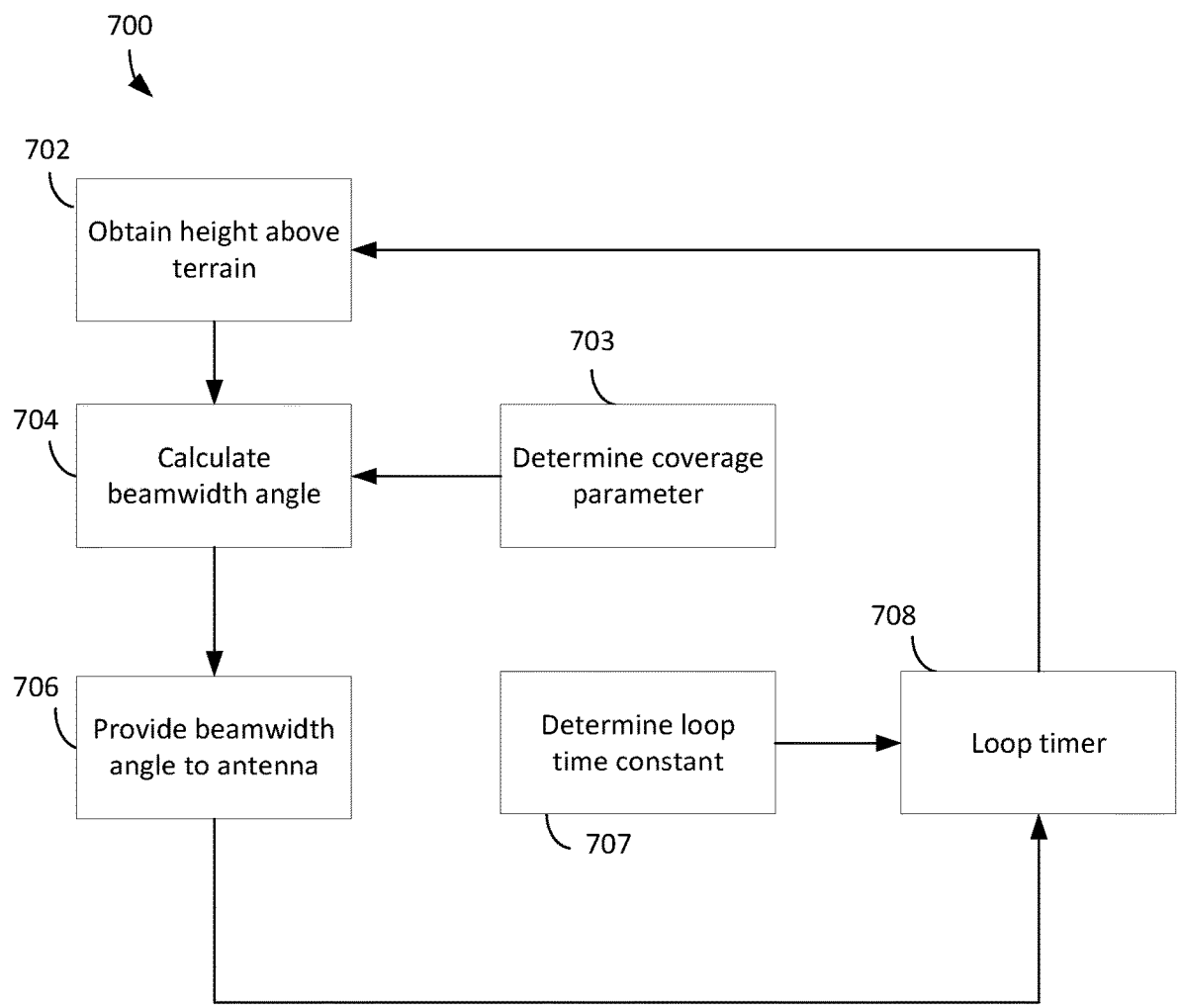
FIG. 7 depicts a block diagram of an exemplary beamwidth adjustment application that adjusts the beamwidth of at least one antenna based on the height above terrain, according to the teachings of the present disclosure.

FIG. 7 depicts a flow diagram of an exemplary beamwidth adjustment application 700 that adjusts the beamwidth of at least one antenna based on the height above terrain of the vehicle. Beamwidth adjustment application 700 can be stored in memory 309 or other memory storage device and executed by processor 310 or other processing device. Beginning at block 702, beamwidth adjustment application 700 obtains a height above terrain by HAT circuitry or other circuitry configured to determine a height above terrain. At block 703, beamwidth adjustment application 700 also determines a desired RF coverage diameter based, for example, on the number and locations of the intended recipients. Using the height above terrain measurements and the desired ground RF coverage diameter, beamwidth adjustment application 700 then calculates the desired beamwidth angle θ at block 704 based on the arctangent of the ground RF coverage diameter divided by the height above terrain. Beamwidth adjustment application 700 then at block 706 provides the calculated beamwidth to at least one antenna comprising a plurality of antenna elements configured to radiate an RF signal at the calculated beamwidth towards the intended recipients.

To update the beamwidth as the height changes, beamwidth adjustment application 700 calculates a loop time constant at block 707 based on the rate of ascent or descent of the vehicle. Beamwidth adjustment application 700 then uses the loop time constant to determine an appropriate loop timer to update the beamwidth of the antenna at block 708. Upon beginning a new iteration, beamwidth adjustment application 700 can repeat the process and update the beamwidth to reflect the new height above terrain measurements received at block 702.

Figure 8:
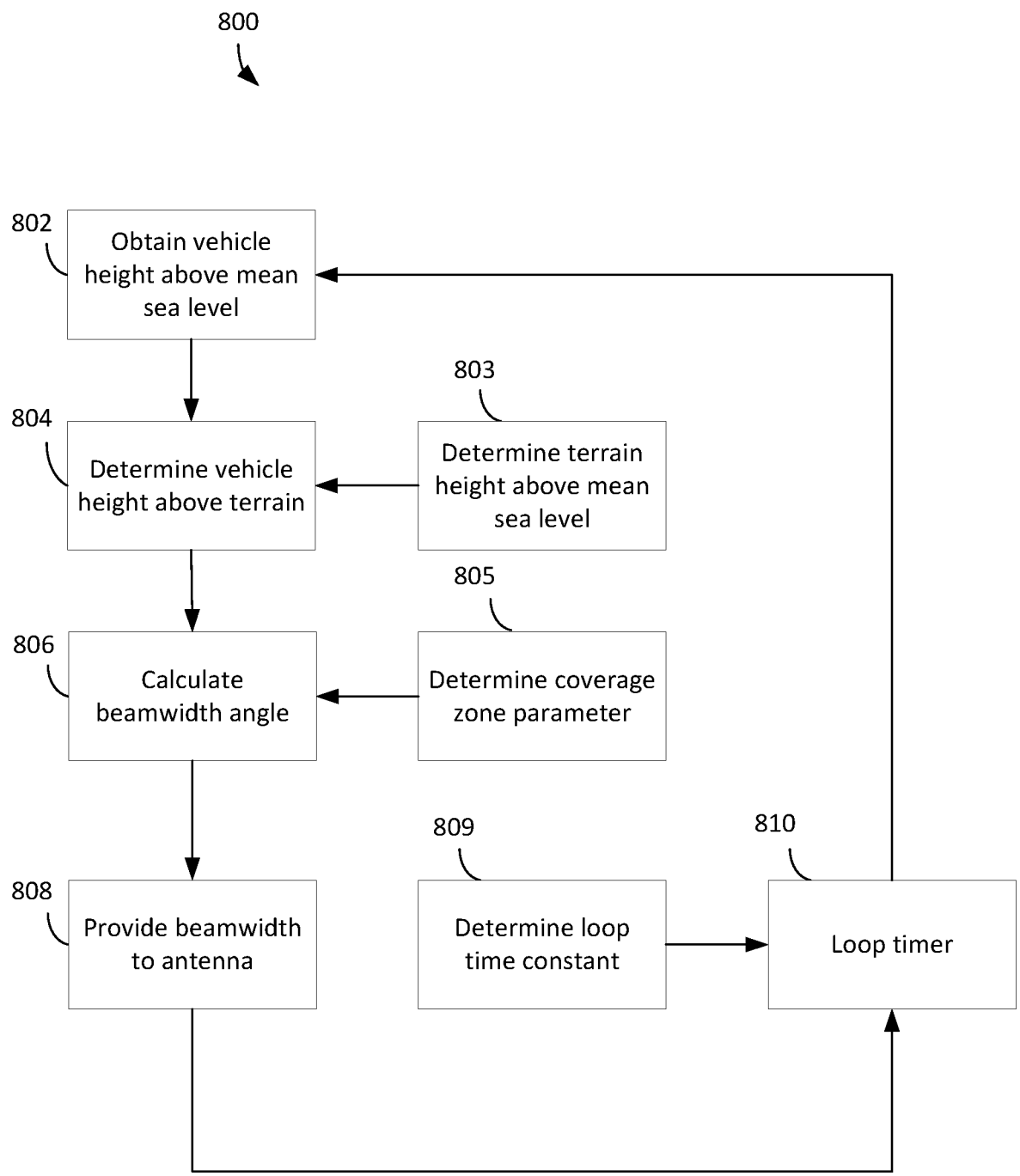
FIG. 8 depicts a block diagram of an exemplary beamwidth adjustment application that adjusts the beamwidth of at least one antenna based on the height above mean sea level, according to the teachings of the present disclosure.

FIG. 8 depicts a flow diagram of an exemplary beamwidth adjustment application that adjusts the beamwidth of at least one antenna based on the height above mean sea level of the vehicle. Beginning at block 802, beamwidth adjustment application 800 obtains a vehicle height above mean sea level from a GNSS receiver. At block 803, beamwidth adjustment application also receives a terrain height above mean sea level. For example, the terrain height above mean sea level can be stored in a database stored in memory and indexed as a function of the position information of the vehicle (e.g., the latitude and longitude coordinates) corresponding to the data received by the GNSS receiver. The terrain height above mean sea level stored in the database and the vehicle height above mean sea level measurements derived from the GNSS receiver are subtracted at block 804 to determine the vehicle height above terrain. At block 805, beamwidth adjustment application 800 also receives a desired ground RF coverage diameter, which is used with the vehicle height above terrain to calculate the beamwidth as previously described at block 806. Beamwidth adjustment application 800 then provides the beamwidth to at least one antenna at block 808. Similar to FIG. 7, beamwidth adjustment application 800 determines a loop time constant at block 809 used to calculate a loop timer at block 810, which can be used to update the beamwidth as the height above mean sea level changes.

Figure 9:
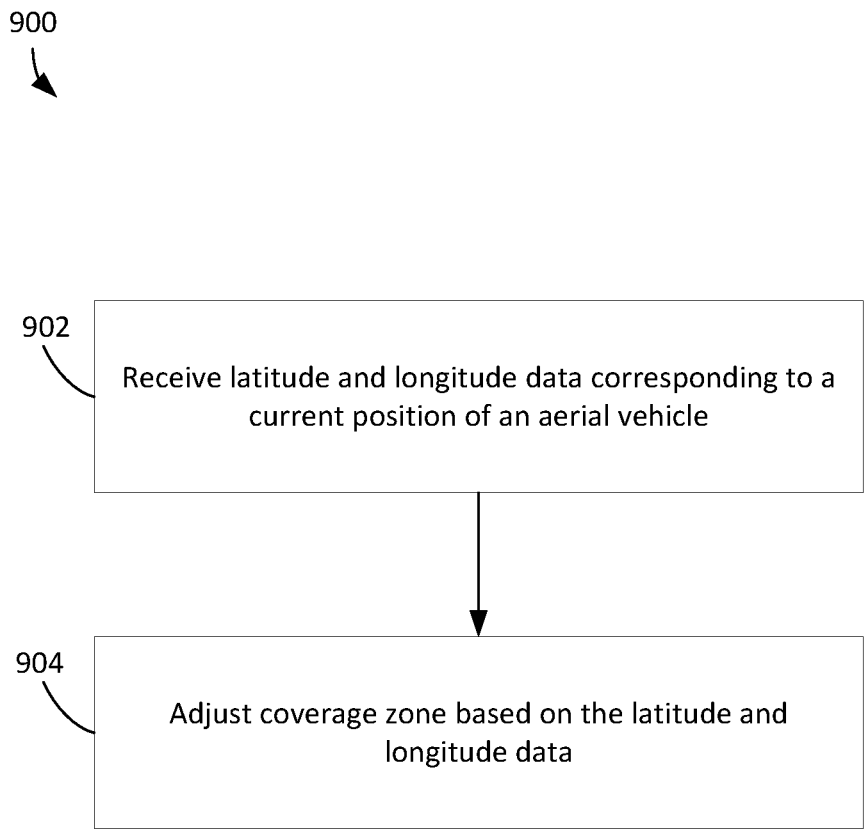
FIG. 9 depicts a flow diagram of an exemplary method for adjusting a coverage zone parameter based on the spacing of ground recipients below the vehicle, according to the teachings of the present disclosure.

FIG. 9 depicts a flow diagram of an exemplary method 900 for adjusting a coverage zone parameter based on the spacing of ground recipients below the vehicle. Method 900 may be implemented using the systems and circuitry described in FIGS. 1-3 and may be combined with the methodology performed in FIGS. 5-8. Method 900 begins at block 902 by receiving latitude and longitude data that corresponds to a current position of an aerial vehicle. The latitude and longitude data can be accessed from a database stored in memory.

At block 904, method 900 adjusts the coverage zone parameter (such as the coverage zone diameter) of a radiated signal based on the latitude and longitude data. The spacing of ground recipients (e.g., cellular radio stations) often varies based on user density. For example, inter-cell spacing in dense urban areas may be as little as a quarter mile, in contrast to spacing of several miles in sparsely populated rural areas. Accordingly, method 900 adjusts the coverage zone of a radiated signal at block 904 depending on the density of the ground recipients for a given set of latitude and longitude coordinates. For example, the latitude and longitude data can be used to determine whether the vehicle is in an area with a high density of ground recipient spacing, which typically occurs in crowded urban environments. The vehicle's latitude and longitude coordinates can indicate that the vehicle is near a densely populated city with a high density of known ground recipients. In this case, method 900 can narrow the beamwidth of the radiated signal so that fewer ground recipients reside within the coverage zone, and hence cause fewer ground recipients to receive the radiated signal. Alternatively, the latitude and longitude data can be used to determine that the vehicle is in an area with sparsely populated ground recipients below the vehicle, which correlates to a more rural environment. If so, then method 900 can broaden the beamwidth of the radiated signal without the risk of introducing additional unintended ground recipients within the coverage zone of the radiated signal.

Figure 10:
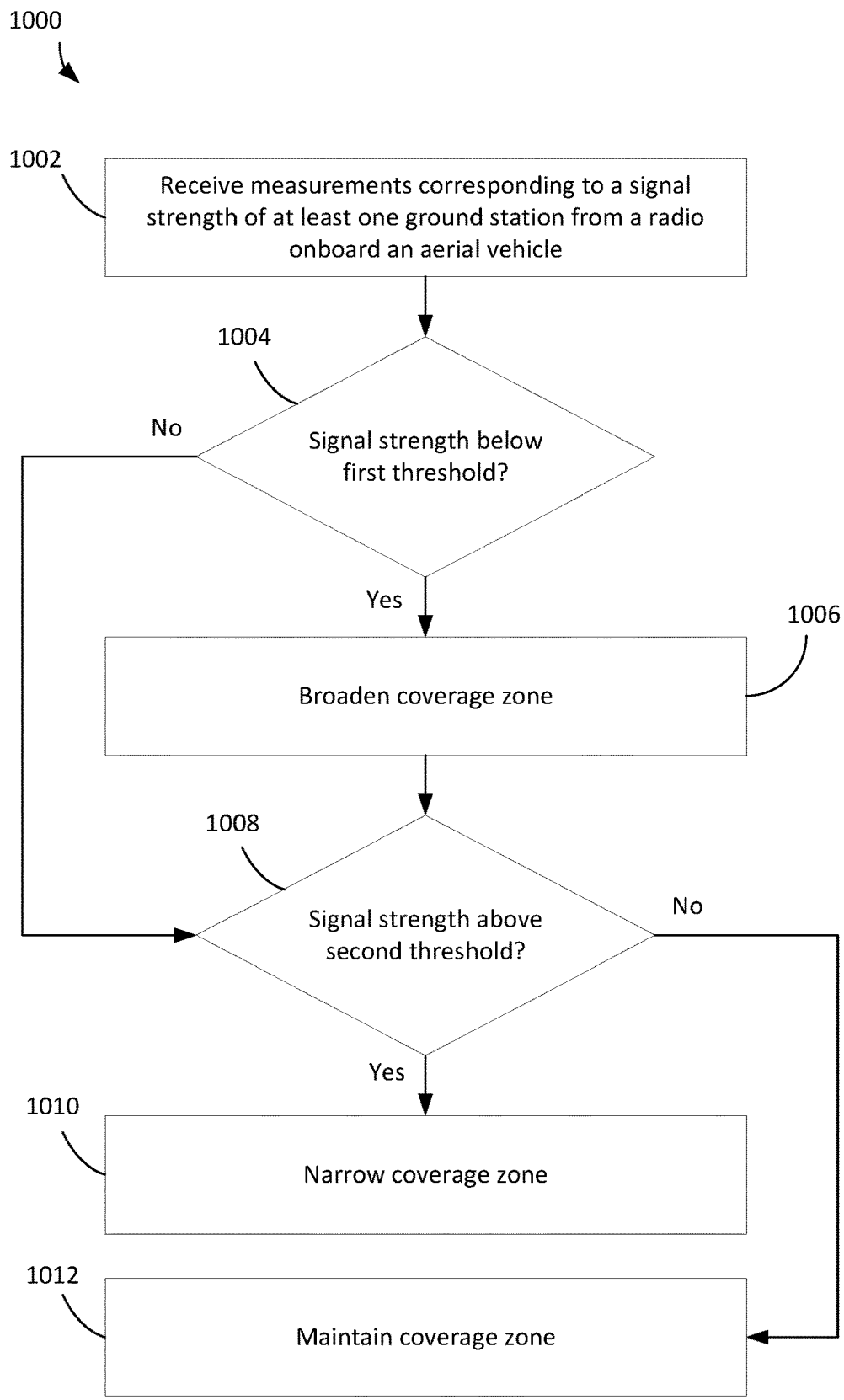
FIG. 10 depicts a flow diagram of an exemplary method for adjusting a coverage zone parameter based on the received radio signal strength from at least one ground recipient, according to the teachings of the present disclosure.

A method 1000 for adjusting the coverage zone of a radiated signal based on the received signal strength from at least one ground station is illustrated in FIG. 10. Similar to FIG. 9, method 1000 can be implemented using systems and circuitry described in FIGS. 1-3, and may be combined with the methodology described in FIGS. 1-9. Method 1000 begins at block 1002 by receiving measurements corresponding to a signal strength from a ground station. Signal strength measurements can include measurements such as signal power, signal intensity, signal voltage, and the like.

The signal strength inversely correlates with the angular displacement from the edge of the beamwidth closest to the ground station. The signal strength from ground stations decrease as the angular displacement from the coverage zone to the ground station increases. Accordingly, at block 1004, method 1000 then compares the signal strength measurements to a first threshold level indicative of a ground station not within the coverage zone. If the signal strength measurements are less than the first threshold, then method 1000 proceeds to block 1006 by increasing the beamwidth of the radiated signal and broadening the coverage zone parameter. In doing so, the beamwidth is more likely to include the intended ground recipient in the coverage zone.

In some embodiments, method 1000 also determines at block 1008 whether the signal strength measurements are above a second threshold. This can be done either by proceeding directly from block 1004 after determining that the signal strength measurements are not below the first threshold, or by first determining that the signal strength measurements are below the first threshold followed by determining whether the signal strength measurements are above the second threshold after broadening the coverage zone parameter at block 1006. The second threshold is indicative of the ground station being located well within the coverage zone, and in at least one embodiment is higher than the first threshold. If the signal strength measurements are above the second threshold, then method 1000 proceeds to block 1010 by reducing the beamwidth of the radiated signal and narrowing the coverage zone parameter. Conversely, if the signal strength measurements are not above the second threshold, then method 1000 proceeds to block 1012 and maintains the coverage zone parameter.

Figure 11:
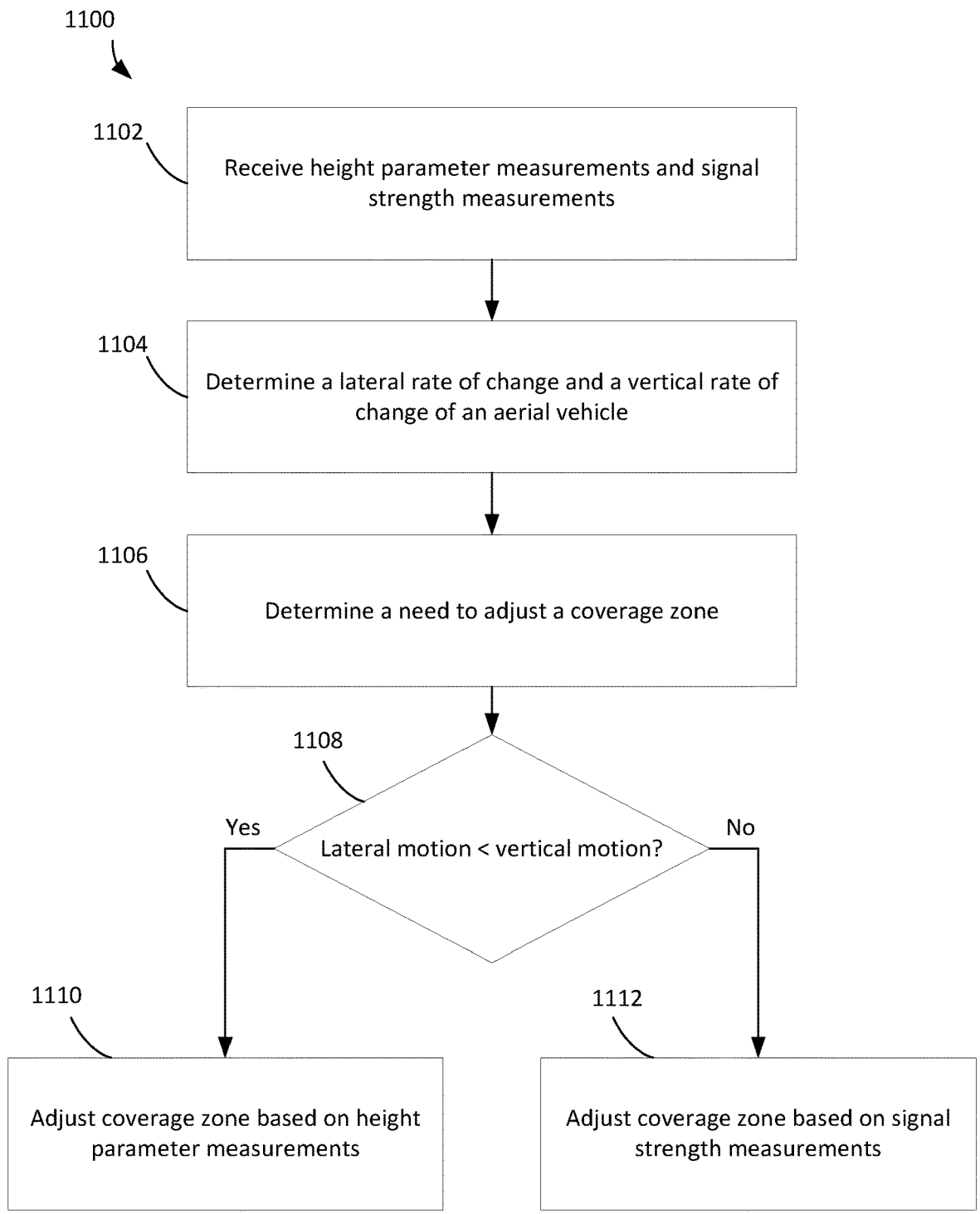
FIG. 11 depicts a flow diagram of an exemplary method for prioritizing coverage zone adjustments, according to the teachings of the present disclosure In accordance with common practice, the various described features are not drawn to scale but are drawn to emphasize specific features relevant to the exemplary embodiments.

FIG. 11 depicts a flow diagram of an exemplary method 1100 for prioritizing a technique for beamwidth adjustments based on the rate of change in position. Similar to the other methods described herein, method 1100 can be implemented using the systems and circuitry described in FIGS. 1-3, and may be combined with the methodology described in FIGS. 4-10. Beginning at block 1102, method 1100 receives height parameter measurements and signal strength measurements. The height parameter measurements can be height above terrain measurements from a radar altimeter, and the signal strength measurements can be measurements from a radio transceiver received from at least one ground station. Method 1100 also determines a lateral rate of change and a vertical rate of change of an aerial vehicle at block 1104.

Proceeding to block 1106, method 1100 determines a need to adjust a coverage zone parameter. This need can arise by having a signal beamwidth that is too large and/or a beamwidth that impacts too many ground recipients. It can also arise when the beamwidth is too narrow to accommodate the spread of intended recipients with which the aerial vehicle wishes to communicate. When such a need arises, method 1100 then determines how to adjust the coverage zone. At block 1108, method 1100 determines whether the lateral rate of change is less than the vertical rate of change. If the lateral motion is changing less than the vertical position, then the vehicle is likely traversing in an area with uniform ground recipient spacing. Accordingly, if the lateral rate of change is less than the vertical rate of change, method 1100 proceeds to block 1110 and adjusts the coverage zone based on the received height parameter measurements, since the height of the vehicle would likely serve as a more useful indicator of how much to adjust the beamwidth of the radiated signal. Conversely, if the lateral rate of change is greater than the vertical rate of change, the vehicle is likely to be transitioning between areas with different ground recipient spacing and the signal strength is likely to serve as a better indicator for how to adjust the beamwidth of the radiated signal. In this case, method 1100 proceeds to block 1112 and adjusts the coverage zone based on the signal strength measurements.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and digital video disks (DVD). Any of the foregoing may be supplemented by, or incorporated in, specially-designed application-specific integrated circuits (ASICs).

Example Embodiments

Example 1 includes a system comprising: at least one height-measuring circuitry coupled to a vehicle, wherein the at least one height-measuring circuitry is configured to measure a height parameter of the vehicle; a radio transceiver coupled to a portion of the vehicle, wherein the radio transceiver is configured to transmit a radio frequency (RF) signal and to receive RF signals; at least one processor configured to receive the height parameter from the at least one height-measuring circuitry; and at least one antenna comprising a plurality of antenna elements coupled to the radio transceiver and coupled to the at least one processor, wherein the at least one antenna is configured to output the RF signal at a beamwidth, wherein the at least one processor is operative to configure the at least one antenna to vary the beamwidth of the RF signal based on the height parameter.

Example 2 includes the system of Example 1, wherein the at least one antenna is mounted on the vehicle, and wherein the height parameter corresponds to a height above terrain of the vehicle.

Example 3 includes the system of any of Examples 1-2, wherein the at least one processor is configured to: receive one or more measurements corresponding to a signal strength of radio frequency (RF) signals corresponding to at least one ground station; and vary a beamwidth of an output signal of the at least one antenna comprising a plurality of antenna elements based on the one or more signal strength measurements.

Example 4 includes the system of any of Examples 1-3, wherein the at least one antenna comprises a phased antenna array, wherein the phased antenna array comprises: a plurality of power controls coupled to the radio transceiver and configured to adjust a power level of the RF signal; a plurality of phase shifters respectively coupled to the plurality of power controls, wherein the plurality of phase shifters is configured to adjust a phase of the RF signal; an antenna array comprising the plurality of antenna elements coupled respectively to the plurality of phase shifters, wherein each of the antenna elements is configured to transmit a portion of the RF signal having a phase corresponding to a respective phase shifter, and wherein the antenna array is configured to transmit the respective portions of the RF signal to form an output signal having a beamwidth; and wherein the at least one processor is coupled to the antenna array and the plurality of power controls and configured to control an output phase of each of the plurality of phase shifters and an output power of each of the plurality of power controls, wherein the at least one processor is operative to configure the antenna array to vary the beamwidth of the RF signal based on the height parameter.

Example 5 includes the system of any of Examples 1-4, wherein the height parameter includes at least one of an altitude, a height above terrain, or a height above mean sea level.

Example 6 includes the system of any of Examples 1-5, further comprising: a global navigation satellite system (GNSS) receiver coupled to the at least one processor, wherein the GNSS receiver is configured to receive signals corresponding to a position of the vehicle and to determine a height above mean sea level from the received signals; a memory storing a database, the database configured to store a height of terrain mean sea level as a function of the position of the vehicle; wherein the at least one processor is configured to calculate height above terrain measurements based on the height of terrain mean sea level stored in the memory and the height above mean sea level and to determine the beamwidth based on the height above terrain measurements.

Example 7 includes the system of any of Examples 1-6, wherein the beamwidth is reduced to maintain a coverage zone as the height parameter of the at least one antenna increases, and wherein the beamwidth is increased to maintain the coverage zone as the height parameter decreases.

Example 8 includes the system of any of Examples 1-7, wherein the at least one processor is configured to obtain a coverage zone parameter, wherein the coverage zone parameter is selected based on locations of one or more ground recipients in a desired coverage zone.

Example 9 includes the system of Example 8, wherein the at least one processor is configured to calculate a loop parameter based on a maximum vertical rate of ascent or rate of descent of the vehicle, and wherein the at least one processor is configured to vary the beamwidth based on the loop parameter, the coverage zone parameter, and the height parameter.

Example 10 includes the system of any of Examples 8-9, wherein the coverage zone parameter is selected so that the number of the one or more ground recipients in the coverage zone parameter is below a threshold number of total allowable ground recipients.

Example 11 includes the system of any of Examples 1-10, wherein the vehicle comprises an unmanned air systems (UAS) vehicle, an urban air mobility (UAM) vehicle, or an Advanced Air Mobility (AAM) vehicle.

Example 12 includes a program product comprising a non-transitory computer-readable medium on which program instructions are embodied, wherein the program instructions are configured, when executed by at least one processor, to cause the at least one processor to: receive one or more measurements corresponding to a height parameter of a vehicle; and configure at least one antenna comprising a plurality of antenna elements coupled to the vehicle to vary a beamwidth of an output signal of the at least one antenna based on the height parameter.

Example 13 includes the program product of Example 12, wherein to configure the at least one antenna to vary a beamwidth comprises reducing the beamwidth to maintain a coverage zone as the height parameter increases, and increasing the beamwidth to maintain the coverage zone as the height parameter decreases.

Example 14 includes the program product of any of Examples 12-13, wherein the program instructions further cause the at least one processor to obtain a coverage zone parameter, wherein the coverage zone parameter is selected based on locations of one or more ground recipients in a desired coverage zone.

Example 15 includes the program product of Example 14, wherein the coverage zone parameter is selected so that the number of the one or more ground recipients in the coverage zone parameter is below a threshold number of total allowable ground recipients.

Example 16 includes the program product of any of Examples 12-15, wherein the program instructions further cause the at least one processor to: receive one or more latitude measurements and one or more longitude measurements corresponding to a current position of the vehicle; and configure the at least one antenna to vary the beamwidth of the output signal based on the one or more latitude measurements and the one or more longitude measurements.

Example 17 includes the program product of any of Examples 12-16, wherein the program instructions further cause the at least one processor to: receive one or more measurements corresponding to a signal strength from a radio coupled to the vehicle; and configure the at least one antenna to vary the beamwidth of the output signal based on the one or more signal strength measurements.

Example 18 includes a method, comprising: receiving one or more measurements corresponding to a signal strength of radio frequency (RF) signals corresponding to at least one ground station from a radio transceiver coupled to a vehicle; and varying a beamwidth of an output signal of at least one antenna comprising a plurality of antenna elements coupled to the vehicle based on the one or more signal strength measurements.

Example 19 includes the method of Example 18, wherein varying the beamwidth of the output signal comprises: broadening the beamwidth of the output signal when the one or more signal strength measurements are below a first threshold; narrowing the beamwidth of the output signal when the one or more signal strength measurements are above a second threshold greater than the first threshold; and maintaining the beamwidth of the output signal when the one or more signal strength measurements are above the first threshold and below the second threshold.

Example 20 includes the method of any of Examples 18-19, further comprising: receiving one or more measurements corresponding to a height parameter of the vehicle; determining a lateral rate of change and a vertical rate of change of the vehicle; and determining a need to adjust the beamwidth of the output signal; wherein varying the beamwidth of the output signal comprises: varying the beamwidth of the output signal based on the height parameter when the lateral rate of change is less than the vertical rate of change; and varying the beamwidth of the output signal based on the one or more signal strength measurements when the lateral rate of change is greater than or equal to the vertical rate of change.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A system comprising:
    at least one height-measuring circuitry coupled to a vehicle, wherein the at least one height-measuring circuitry is configured to measure a height parameter of the vehicle;
    a radio transceiver coupled to a portion of the vehicle, wherein the radio transceiver is configured to transmit a radio frequency (RF) signal and to receive RF signals;
    at least one processor configured to receive the height parameter from the at least one height-measuring circuitry; and
    at least one antenna comprising a plurality of antenna elements operatively coupled to the radio transceiver and operatively coupled to the at least one processor, wherein the at least one antenna is configured to output the RF signal at a beamwidth,
    wherein the at least one processor is operative to configure the at least one antenna to vary the beamwidth of the RF signal based on the height parameter.

2. The system of claim 1, wherein the at least one antenna is mounted on the vehicle, and wherein the height parameter corresponds to a height above terrain of the vehicle.

3. The system of claim 1, wherein the at least one processor is configured to:
    receive one or more measurements corresponding to a signal strength of radio frequency (RF) signals corresponding to at least one ground station; and
    vary the beamwidth of the RF signal of the at least one antenna comprising a plurality of antenna elements based on the one or more measurements.

4. The system of claim 1, wherein the at least one antenna comprises a phased antenna array, wherein the phased antenna array comprises: a plurality of power controls coupled to the radio transceiver and configured to adjust a power level of the RF signal;
    a plurality of phase shifters respectively coupled to the plurality of power controls, wherein the plurality of phase shifters is configured to adjust a phase of the RF signal;
    an antenna array comprising the plurality of antenna elements coupled respectively to the plurality of phase shifters, wherein each of the antenna elements is configured to transmit a portion of the RF signal having a phase corresponding to a respective phase shifter, and wherein the antenna array is configured to transmit the respective portions of the RF signal to form an output signal having a beamwidth; and
    wherein the at least one processor is coupled to the antenna array and the plurality of power controls and configured to control an output phase of each of the plurality of phase shifters and an output power of each of the plurality of power controls, wherein the at least one processor is operative to configure the antenna array to vary the beamwidth of the RF signal based on the height parameter.

5. The system of claim 1, wherein the height parameter includes at least one of an altitude, a height above terrain, or a height above mean sea level.

6. The system of claim 1, further comprising:
    a global navigation satellite system (GNSS) receiver coupled to the at least one processor, wherein the GNSS receiver is configured to receive signals corresponding to a position of the vehicle and to determine a height above mean sea level from the received signals;
    a memory storing a database, the database configured to store a height of terrain mean sea level as a function of the position of the vehicle;
    wherein the at least one processor is configured to calculate height above terrain measurements based on the height of terrain mean sea level stored in the memory and the height above mean sea level and to determine the beamwidth based on the height above terrain measurements.

7. The system of claim 1, wherein the beamwidth is reduced to maintain a coverage zone as the height parameter of the at least one antenna increases, and wherein the beamwidth is increased to maintain the coverage zone as the height parameter decreases.

8. The system of claim 1, wherein the at least one processor is configured to obtain a coverage zone parameter, wherein the coverage zone parameter is selected based on locations of one or more ground recipients in a desired coverage zone.

9. The system of claim 8, wherein the at least one processor is configured to calculate a loop parameter based on a maximum vertical rate of ascent or rate of descent of the vehicle, and wherein the at least one processor is configured to vary the beamwidth based on the loop parameter, the coverage zone parameter, and the height parameter.

10. The system of claim 8, wherein the coverage zone parameter is selected so that the number of the one or more ground recipients in the coverage zone parameter is below a threshold number of total allowable ground recipients.

11. The system of claim 1, wherein the vehicle comprises an unmanned air systems (UAS) vehicle, an urban air mobility (UAM) vehicle, or an Advanced Air Mobility (AAM) vehicle.

12. A program product comprising a non-transitory computer-readable medium on which program instructions are embodied,
    wherein the program instructions are configured, when executed by at least one processor, to cause the at least one processor to:
    receive one or more measurements corresponding to a height parameter of a vehicle, wherein the one or more measurements are received from height-measuring circuitry coupled to the vehicle; and
    configure at least one antenna comprising a plurality of antenna elements coupled to the vehicle to vary a beamwidth of an output signal of the at least one antenna based on the height parameter.

13. The program product of claim 12, wherein to configure the at least one antenna to vary the beamwidth comprises reducing the beamwidth to maintain a coverage zone as the height parameter increases, and increasing the beamwidth to maintain the coverage zone as the height parameter decreases.

14. The program product of claim 12, wherein the program instructions further cause the at least one processor to obtain a coverage zone parameter, wherein the coverage zone parameter is selected based on locations of one or more ground recipients in a desired coverage zone.

15. The program product of claim 14, wherein the coverage zone parameter is selected so that the number of the one or more ground recipients in the coverage zone parameter is below a threshold number of total allowable ground recipients.

16. The program product of claim 12, wherein the program instructions further cause the at least one processor to:
receive one or more latitude measurements and one or more longitude measurements corresponding to a current position of the vehicle; and
configure the at least one antenna to vary the beamwidth of the output signal based on the one or more latitude measurements and the one or more longitude measurements.

17. The program product of claim 12, wherein the program instructions further cause the at least one processor to:
receive one or more measurements corresponding to a signal strength from a radio coupled to the vehicle; and
configure the at least one antenna to vary the beamwidth of the output signal based on the one or more signal strength measurements.

18. A method, comprising:
receiving, at one or more processors, one or more measurements corresponding to a height parameter from height-measuring circuitry coupled to a vehicle; and
configuring, by the one or more processors, at least one antenna comprising a plurality of antenna elements coupled to the vehicle to vary a beamwidth of an output signal of the at least one antenna based on the one or more measurements corresponding to the height parameter received from the height-measuring circuitry.

19. The method of claim 18, comprising: broadening the beamwidth of the output signal when the one or more measurements are below a first threshold;
narrowing the beamwidth of the output signal when the one or more measurements are above a second threshold greater than the first threshold; and maintaining the beamwidth of the output signal when the one or more measurements are above the first threshold and below the second threshold.

20. The method of claim 18, further comprising: receiving one or more measurements corresponding to a signal strength of radio frequency (RF) signals corresponding to at least one ground station from a radio transceiver coupled to the vehicle; and configuring the at least one antenna to vary the beamwidth of the output signal based on the one or more measurements.

* * * * *